O. E. FLOBERG.
SAW SET.
APPLICATION FILED JULY 17, 1920.
1,404,384. Patented Jan. 24, 1922.
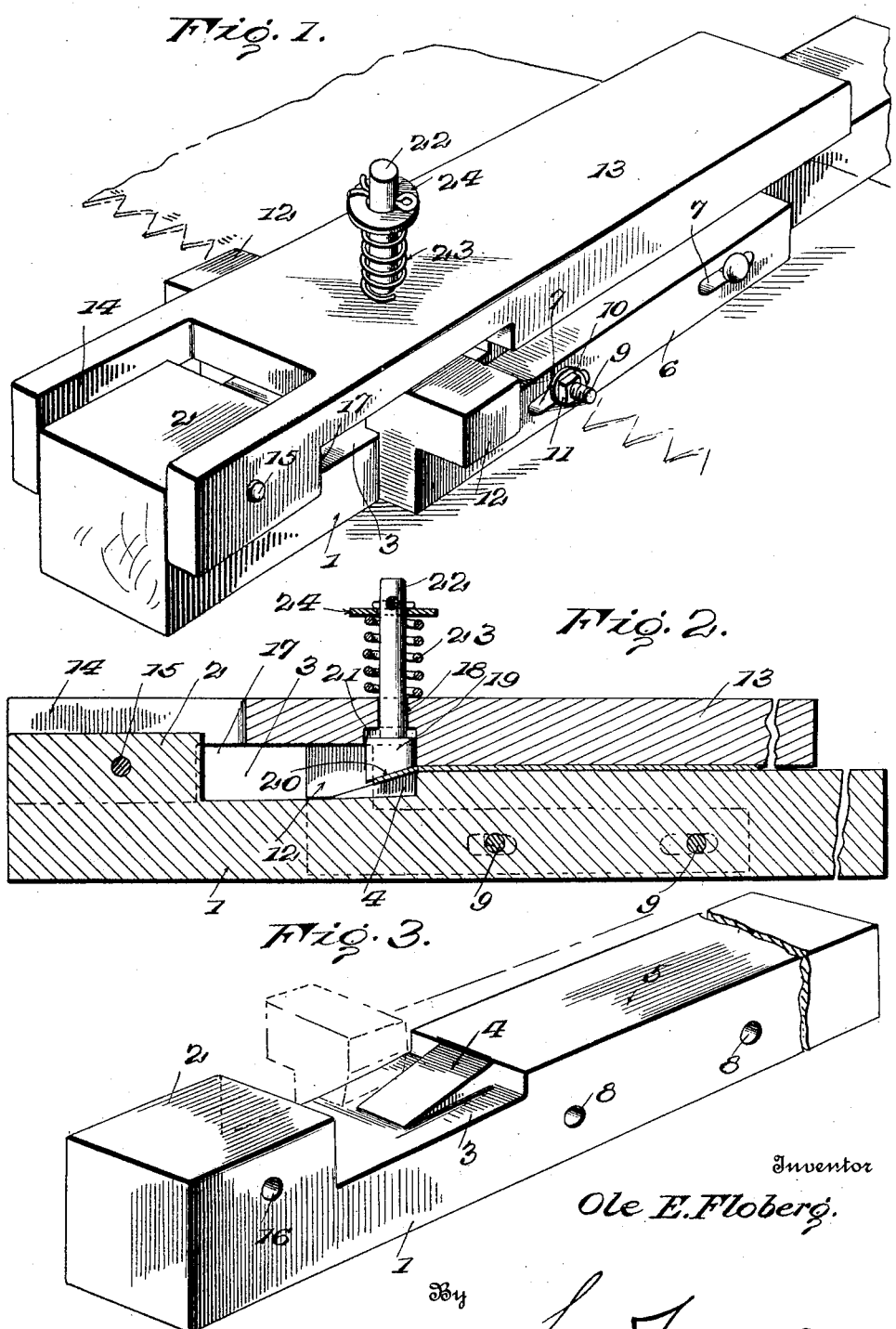
Inventor
Ole E. Floberg.
By Lacey & Lacey, Attorneys

UNITED STATES PATENT OFFICE.

OLE E. FLOBERG, OF SHELLY, MINNESOTA.

SAW SET.

1,404,384.  Specification of Letters Patent.  Patented Jan. 24, 1922.

Application filed July 17, 1920. Serial No. 396,879.

*To all whom it may concern:*

Be it known that I, OLE E. FLOBERG, a citizen of the United States, residing at Shelly, in the county of Norman and State of Minnesota, have invented certain new and useful Improvements in Saw Sets, of which the following is a specification.

My invention relates to saw sets and has for its object the provision of an inexpensive and simple tool which may be operated by hand and readily adjusted and manipulated to set the teeth of a saw at a desired angle with all the teeth at the same angle relative to the blade of the saw. The objects of the invention are attained in such a device as is illustrated in the accompanying drawings and the invention resides in certain novel features which will be hereinafter first fully described and then more particularly pointed out in the appended claims.

In the drawings—

Figure 1 is a perspective view of my improved tool, a saw being indicated in position therein in dotted lines;

Fig. 2 is a longitudinal section thereof;

Fig. 3 is a detail perspective view of the base member of the device.

In carrying out my invention, I employ a base block 1 which may be of any preferred material and is preferably in the form of an oblong bar provided at one end with a head 2 on its upper side. Immediately adjacent the said head, the bar is provided with a recess 3 in its upper side and at the end of the said recess remote from the head an anvil 4 is provided. The surface 5 at the rear of the recess 3 constitutes a support for the saw blade as will be readily understood upon reference to Fig. 2, and the anvil 4 extends forwardly from the rear wall of the said recess, being in the form of a block having its upper surface inclined downwardly and forwardly from the blade-supporting surface 5 to the base of the recess 3, as clearly shown. Gage bars are provided at each side of the base member and these bars consist of shanks 6 having longitudinal slots 7 therein through which and openings 8 in the base member securing bolts 9 are inserted, washers 10 and nuts 11 being mounted upon the said bolts to bear against the shanks 6 and clamp them to the sides of the base. The slots 7 obviously permit the shanks to be shifted longitudinally of the base so that the heads or stop members 12 at the front ends of the shanks may be set closer to or more remote from the rear wall of the recess 3 as will be readily understood. These heads 12 are disposed laterally with respect to the shanks 6 and extend beyond both sides thereof so that in assembling the tool the gage bars may be fitted indiscriminately to either side of the tool and it is not necessary to apply either gage to a particular side of the base. One end of the head obviously projects into the recess 3 and the edge of the saw or the points of the saw teeth bear against the rear sides of the heads so that the teeth will project over the anvil to a uniform degree. A die carrier 13 is disposed above the base member and consists of a bar of proper dimensions having its forward end forked, as shown at 14, to span the head 2 to which it is pivotally attached by a pin or rod 15 inserted through the sides of the fork and a suitable opening 16 formed through the head. The under side of the die carrier is cut-away, as indicated at 17, so that it may fit over the inner ends of the heads 12 and a vertical opening 18 is formed through the said die carrier at a proper point to locate the die 19 in operative relation to the anvil 4. The said die is preferably a hardened steel block having its lower end beveled, as shown at 20, to conform to the inclination of the upper surface of the anvil and playing within a socket 21 in the under side of the die carrier in axial alinement with the opening 18. A stem 22 rises from the die through the opening 18 and is adapted to reciprocate in the said opening, a spring 23 coiled around the stem between the die carrier and an abutment 24 on the stem serving to yieldably hold the die in its raised position.

The construction and arrangement of the several parts of my improved tool being thus made known, it is thought the use of the same will be readily understood and appreciated. When the teeth of a saw are to be set, the die carrier is swung upwardly about the pivot 15 and the saw is then laid upon the saw-supporting surface 5 of the base, the bases or wider ends of the saw teeth being disposed immediately over and alined with the front edge of the said surface and the basal end of the anvil. The gages are then adjusted so that the heads 12 will touch the points of the saw teeth and are secured in that position, after which the die carrier is swung down over the saw, as clearly shown in Fig. 2. The die 19 will thus be brought directly over a saw tooth and a sharp blow delivered upon the upper end of the stem 22 will drive the die downwardly so that the tooth will be bent against the anvil and given the desired set. The spring 23 will automatically lift the die from the tooth after the pressure is released and the saw is then shifted along the surfaces of the heads 12 until the next alternate tooth is brought into position below the die. The operation is then repeated until the alternate teeth have been set in one direction, after which the saw is reversed so that the unset teeth may be set in the opposite direction but at the same angle. The gages are, of course, adjusted to the depth of the saw teeth and in order to insure all the teeth being uniformly set, it is necessary only to maintain the points of the saw teeth in contact with the heads 12 as the saw is shifted through the tool. The device is exceedingly simple in the construction and arrangement of its parts and may be produced at a very low cost. In use, it will be found highly efficient for the purposes for which it is designed.

Having thus described the invention, what is claimed as new is:

1. A saw set comprising a base member having a saw-supporting surface and having a reduced portion in advance of said surface, an anvil within the said reduced portion of the base member, a die carrier pivotally mounted above and in advance of the anvil, and a longitudinally adjustable gage mounted upon the side of the base member and having a laterally disposed head projecting over the reduced portion of the base member in advance of and adjacent the anvil.

2. A saw set comprising a base member having a head at its front end and having a recess in its upper side adjacent its head, and a saw-supporting surface at the rear of said recess, an anvil within the recess immediately adjacent the said saw-supporting surface, a die carrier having its front end forked to span the head on the base member and pivoted thereto, said die carrier being adapted to extend over the base member and bear upon a saw resting thereon, a die yieldably supported in the die carrier in position to cooperate with the anvil, and a gage adjustably mounted upon the side of the base member and having a laterally extending head projecting within the recess in the base member and beneath the die carrier adjacent the anvil.

In testimony whereof I affix my signature.

OLE E. FLOBERG. [L. S.]